US012012133B2

(12) United States Patent
Okazaki et al.

(10) Patent No.: US 12,012,133 B2
(45) Date of Patent: Jun. 18, 2024

(54) MOVING BODY CONTROL DEVICE, MOVING BODY, MOVING BODY CONTROL METHOD, AND PROGRAM

(71) Applicant: MITSUBISHI HEAVY INDUSTRIES, LTD., Tokyo (JP)

(72) Inventors: Hirotaka Okazaki, Tokyo (JP); Noritaka Yanai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 334 days.

(21) Appl. No.: 17/424,060

(22) PCT Filed: Feb. 6, 2020

(86) PCT No.: PCT/JP2020/004610
§ 371 (c)(1),
(2) Date: Jul. 19, 2021

(87) PCT Pub. No.: WO2020/170842
PCT Pub. Date: Aug. 27, 2020

(65) Prior Publication Data
US 2022/0097742 A1     Mar. 31, 2022

(30) Foreign Application Priority Data
Feb. 20, 2019   (JP) ................. 2019-028642

(51) Int. Cl.
*B61L 15/00*     (2006.01)
*B61F 5/38*     (2006.01)
(52) U.S. Cl.
CPC ............ *B61L 15/0058* (2024.01); *B61F 5/38* (2013.01)
(58) Field of Classification Search
CPC ...... B61L 3/006; G05D 1/0265; G05D 1/021; B61B 13/00; B61F 5/38; B61F 5/44
See application file for complete search history.

(56) References Cited

U.S. PATENT DOCUMENTS 10,144,438 B2 * 12/2018 Yanobu ............... B61F 5/38
2010/0100267 A1 * 4/2010 Morichika ........... B62D 1/265
701/23

FOREIGN PATENT DOCUMENTS

DE     19538379 C1 * 1/1997 ........... B61F 5/38
EP      2045163 A1 * 4/2009 ........... B61B 10/04
(Continued)

OTHER PUBLICATIONS

Pradhan et al.; Study of Dynamic Behavior of Active Steering Railway Vehicles; Machines, Mechanism and Robotics: Proc. of iNaCoMM 2017; Springer; Singapore: 2019 (Year: 2019).*
(Continued)

*Primary Examiner* — Michael J Zanelli
(74) *Attorney, Agent, or Firm* — HAUPTMAN HAM, LLP

(57) ABSTRACT

A moving body control device for controlling a moving body, including an information acquisition unit that acquires moving body-specific information including a bogie position and a vehicle body mass, a moving body position, a moving body velocity, and track information including a curvature for each position of the track, and a feedforward steering angle calculation unit that calculates a steering angle by using the moving body-specific information, the moving body position, the moving body velocity, and the track information. The feedforward steering angle calculation unit calculates the steering angle according to a sum of a kinematic component calculated based on a geometrical relationship between the bogie position and the curvature of a track, and a dynamic component calculated based on an equation of motion including the bogie position, the vehicle body mass, the moving body velocity, and the curvature and a curvature change rate of the track.

7 Claims, 5 Drawing Sheets

(56) References Cited

FOREIGN PATENT DOCUMENTS

| | | | | |
|---|---|---|---|---|
| EP | 2517943 A1 | * | 10/2012 | .............. B61F 5/386 |
| JP | 2001225744 A | | 8/2001 | |
| JP | 2009023509 A | | 2/2009 | |

OTHER PUBLICATIONS

International Search Report and Written Opinion of International Application No. PCT/JP2020/004610 dated Mar. 24, 2020; 13pp.

* cited by examiner

<TRACK INFORMATION>

| POSITION (c) ON TRACK | CURVATURE (s) | CURVATURE CHANGE RATE (sx) | BANK ANGLE ($\phi$) |
|---|---|---|---|
| $c_0$ | $s_0$ | $sx_0$ | $\phi_0$ |
| $c_1$ | $s_1$ | $sx_1$ | $\phi_1$ |
| ... | ... | ... | ... |
| $c_n$ | $s_n$ | $sx_n$ | $\phi_n$ |

MOVING BODY CONTROL DEVICE, MOVING BODY, MOVING BODY CONTROL METHOD, AND PROGRAM

RELATED APPLICATIONS

The present application is a National Phase of International Application Number PCT/JP2020/004610 filed Feb. 6, 2020 and claims priority to Japanese Application Number 2019-028642 filed Feb. 20, 2019.

TECHNICAL FIELD

The present disclosure relates to a moving body control device, a moving body, a moving body control method, and a program.

Priority is claimed on Japanese Patent Application No. 2019-028642, filed Feb. 20, 2019, the content of which is incorporated herein by reference.

BACKGROUND ART

Patent Document 1 discloses an automatic steering mechanism that enables fine-tuned steering control in a track-based transportation system. Specifically, the controller described in Patent Document 1 creates a pattern steering angle table showing the pattern steering angles of the front and rear wheels for each change point of the track, from the track conditions, traveling conditions, and vehicle conditions from the starting point to the destination point before departure, and calculates a steering angle command based on the pattern steering angle from the distance from the starting point.

CITATION LIST

Patent Document

[Patent Document 1] Japanese Unexamined Patent Application Publication No. 2009-023509

SUMMARY OF INVENTION

Technical Subject

In the related art, on the premise of traveling at a constant velocity, only the steering angle using kinematics (geometrical relationship) is calculated as the feedforward steering angle. In this case, since the steering angle command is calculated based on the map information on a movement route stored in advance and the steering angle of each wheel is controlled, the steering is performed in advance even at the change point on the traveling route, so that stable steering or traveling can be performed. However, such a calculation method does not support steering that requires dynamics, for example, such as a case where a moving body accelerates or decelerates, so it is assumed that an error will occur in the accuracy of the feedforward steering angle.

An object of the present disclosure is to provide a moving body control device, a moving body, a moving body control method, and a program capable of calculating a feedforward steering angle with higher accuracy in consideration of dynamics.

Subject to be Solved

According to one aspect of the present disclosure, the moving body control device is a moving body control device which controls a moving body traveling along a predetermined track, the device including: an information acquisition unit that acquires moving body-specific information including a bogie position and a vehicle body mass, a moving body position, a moving body velocity, and track information including a curvature for each position of the track; and a feedforward steering angle calculation unit that calculates a steering angle by using the moving body-specific information, the moving body position, the moving body velocity, and the track information, in which the feedforward steering angle calculation unit calculates the steering angle according to a sum of a kinematic component calculated based on a geometrical relationship between the bogie position and the curvature of the track at the moving body position, and a dynamic component calculated based on an equation of motion including the bogie position, the vehicle body mass, the moving body velocity, and the curvature and a curvature change rate of the track at the moving body position.

According to one aspect of the present disclosure, in the moving body control device, the track information may further include a bank angle for each position of the track, and the feedforward steering angle calculation unit calculates the dynamic component by further using force acting in a left-right direction of the moving body according to the bank angle.

According to one aspect of the present disclosure, the moving body control device may further include a feedback steering angle calculation unit that acquires a deviation amount of the moving body from the track at a current time, and calculates the steering angle such that the deviation amount becomes small.

According to one aspect of the present disclosure, the feedforward steering angle calculation unit calculates the kinematic component, based on an angle formed by a second tangent which is a tangent of the track at a position of a front bogie with respect to a first tangent which is a tangent of the track at a position of a rear bogie, and a distance between the rear bogie and the front bogie in a direction orthogonal to the first tangent.

According to one aspect of the present disclosure, the moving body includes the above-described moving body control device.

According to one aspect of the present disclosure, the moving body control method is a moving body control method which controls a moving body traveling along a predetermined track, the method including: a step of acquiring moving body-specific information including a bogie position and a vehicle body mass, a moving body position, a moving body velocity, and track information including a curvature for each position of the track; and a step of calculating a steering angle by using the moving body-specific information, the moving body position, the moving body velocity, and the track information, in which the step of calculating the steering angle includes a step of calculating the steering angle according to a sum of a kinematic component calculated based on a geometrical relationship between the bogie position and the curvature of the track at the moving body position, and a dynamic component calculated based on an equation of motion including the bogie position, the vehicle body mass, the moving body velocity, and the curvature and a curvature change rate of the track at the moving body position.

According to one aspect of the present disclosure, the program causing a computer of a moving body control device which controls a moving body traveling along a predetermined track to execute a step of acquiring moving body-specific information including a bogie position and a vehicle body mass, a moving body position, a moving body velocity, and track information including a curvature for each position of the track; and a step of calculating a steering angle by using the moving body-specific information, the moving body position, the moving body velocity, and the track information. The step of calculating the steering angle includes a step of calculating the steering angle according to a sum of a kinematic component calculated based on a geometrical relationship between the bogie position and the curvature of the track at the moving body position, and a dynamic component calculated based on an equation of motion including the bogie position, the vehicle body mass, the moving body velocity, and the curvature and a curvature change rate of the track at the moving body position.

Advantageous Effects of Invention

According to each aspect of the above disclosure, it is possible to calculate the feedforward steering angle with higher accuracy in consideration of dynamics.

DESCRIPTION OF EMBODIMENTS

First Embodiment

Hereinafter, a moving body control device according to a first embodiment and a moving body including the moving body control device will be described with reference to FIGS. 1 to 6.
(Overall Configuration of Moving Body)

Figure 1:
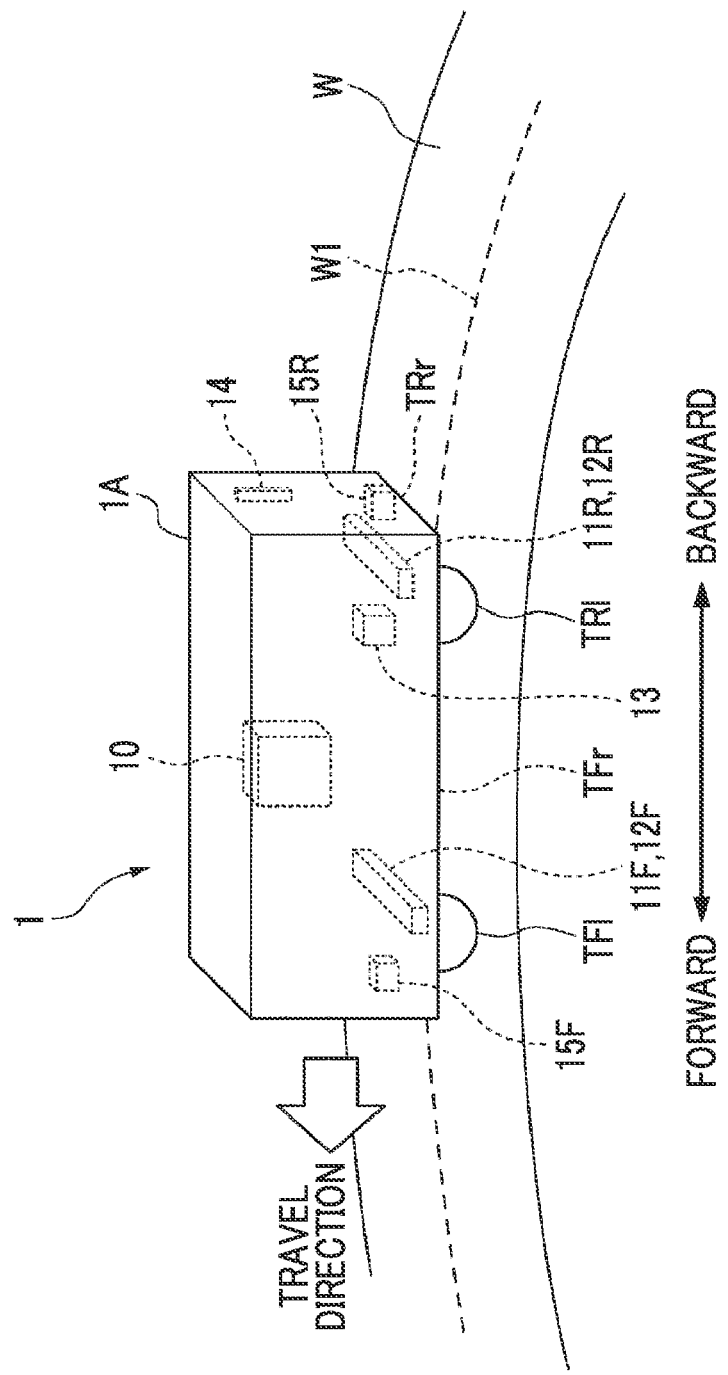
FIG. 1 is a diagram illustrating an overall configuration of a moving body according to a first embodiment.

FIG. 1 is a diagram illustrating an overall configuration of the moving body according to the first embodiment.

A moving body 1 is a moving body (vehicle) used in a track-based transportation system, and automatically travels on a predetermined track W1. The track W1 is predetermined along the movement route W from the current position of the moving body 1 to the destination.

As illustrated in FIG. 1, the moving body 1 includes a moving body housing 1A, front bogies TF1 and TFr which are front left and right wheels, and rear bogies TR1 and TRr which are rear left and right wheels. The moving body 1 is capable of individually steering the front bogies TF1 and TFr and the rear bogies TR1 and TRr.

The moving body housing 1A includes a controller 10 (moving body control device), actuators 11F and 11R, steering angle sensors 12F and 12R, a velocity detection device 13, a position detection device 14, and displacement sensors 15F and 15R.

The controller 10 controls the entire traveling control of the moving body 1. The details of the function of the controller 10 will be described later.

The actuator 11F is a steering mechanism for the front bogies TF1 and TFr. The actuator 11R is a steering mechanism for the rear bogies TR1 and TRr. The actuators 11F and 11R operate according to the steering angle command output from the controller 10.

The steering angle sensors 12F and 12R are sensors that detect the steering angle formed by the actuators 11F and 11R.

The velocity detection device 13 is a so-called velocity sensor, and detects the traveling velocity of the moving body 1. The position detection device 14 detects the current position of the moving body 1 from the positioning information provided by, for example, Global Navigation Satellite System (GNSS).

The displacement sensors 15F and 15R are sensors installed on the front side and the rear side of the moving body housing 1A, respectively, and detect the deviation amount (displacement) from the track W1 at the installation position.
(Functional Configuration of Moving Body)

Figure 2:
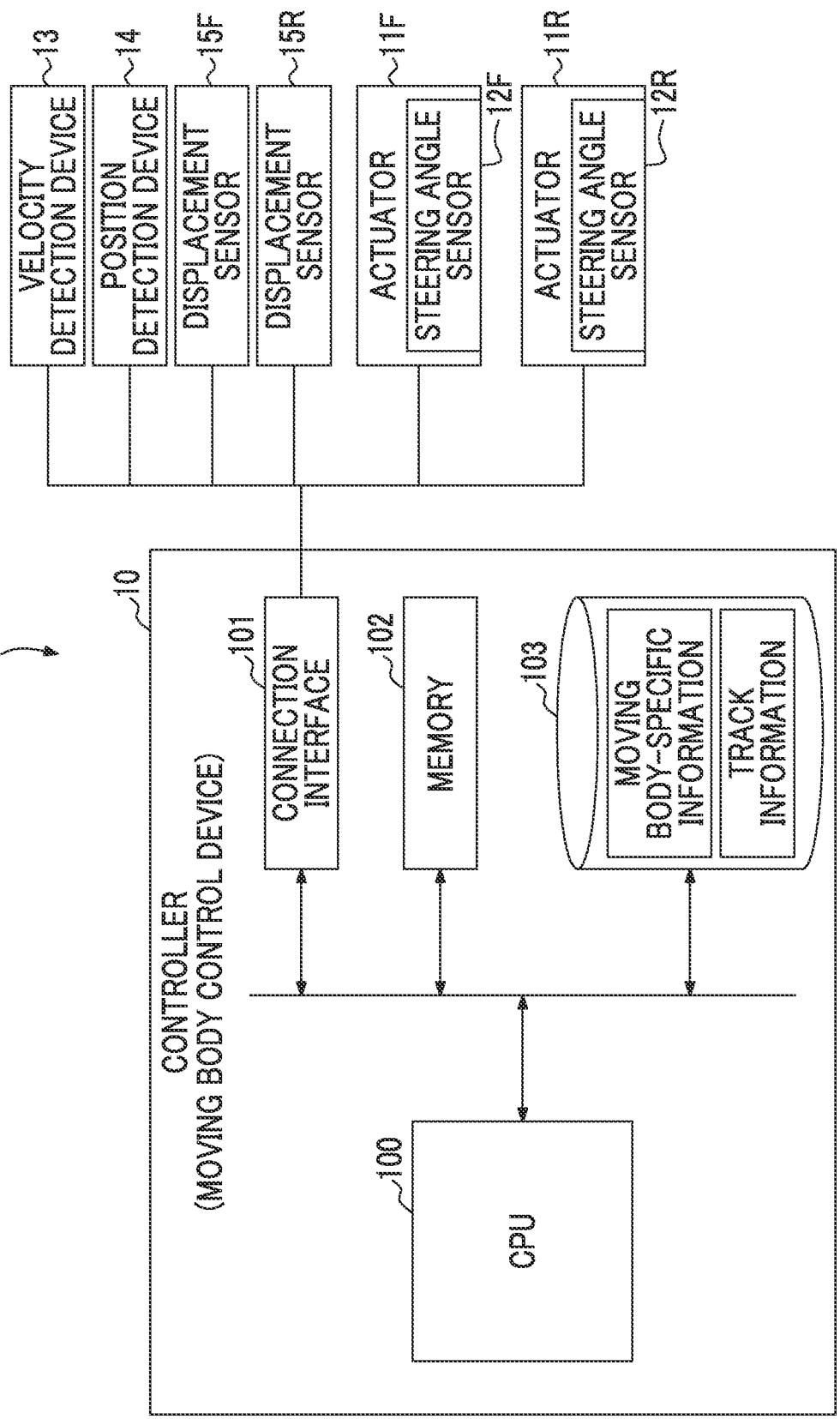
FIG. 2 is a first diagram illustrating a functional configuration of the moving body according to the first embodiment.
Figures 3, 4:
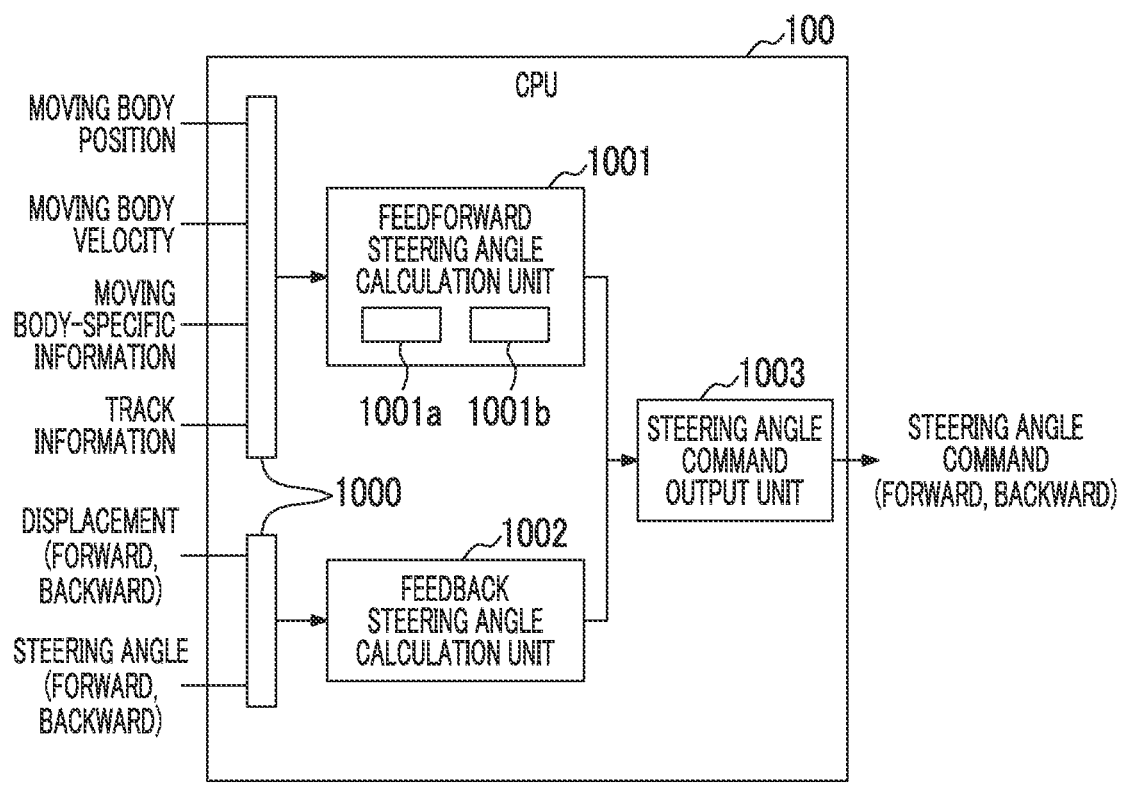
FIG. 3 is a second diagram illustrating a functional configuration of the moving body according to the first embodiment.
FIG. 4 is a third diagram illustrating a functional configuration of the moving body according to the first embodiment.

FIGS. 2 to 4 are diagrams illustrating the functional configurations of the moving body according to the first embodiment, respectively. As illustrated in FIG. 2, the controller 10 includes a CPU 100, a connection interface 101, a memory 102, and a storage 103.

The CPU 100 is a processor that operates according to a program prepared in advance. The process executed by the CPU 100 will be described later.

The connection interface 101 is a connection interface with the various actuators and sensors described above.

The memory 102 is a so-called main storage device, and instructions, data, and the like for the CPU 100 to operate according to a program are expanded.

The storage 103 is a so-called auxiliary storage device, and is, for example, a Hard Disk Drive (HDD), a Solid State Drive (SSD), or the like. In the present embodiment, the moving body-specific information and the track information are recorded in advance in the storage 103.

The "moving body-specific information" is information unique to the moving body 1 and indicating a universal value of the moving body 1. Specifically, the moving body-specific information includes the weight (vehicle body mass) of the moving body 1. Further, the moving body-specific information includes information indicating the positional relationship between the center of gravity of the moving body housing 1A and the front bogies TF1 and TFr, and the positional relationship between the center of gravity of the moving body housing 1A and the rear bogies TR1 and TRr (hereinafter, also referred to as "bogie position").

The "track information" is a group of information associated with each position on the track W1 formed by segmenting the track W1 from the start to the goal by a predetermined unit distance. Specifically, as illustrated in FIG. 3, the track information indicates the curvature ($s0$, $s1$, ...), the curvature change rate ($sx0$, $sx1$, ...), and bank angles ($\varphi 1$, $\varphi 1$, ...) at each position ($c0$, $c1$, ...) on the track W1. The curvature change rate is the rate of change of the curvature ($s0$, $s1$, ...) per unit distance on the track W1. The controller 10 according to another embodiment may calculate and acquire the curvature change rate from the relationship between the position (c0, c1, ... ) on the track W1 and the curvature (s0, s1, ... ).

The functions of the CPU 100 will be described in detail with reference to FIG. 4.

By operating according to a program prepared in advance, the CPU 100 exerts the following functions as an information acquisition unit 1000, a feedforward steering angle calculation unit 1001, a feedback steering angle calculation unit 1002, and a steering angle command output unit 1003.

The information acquisition unit 1000 sequentially acquires various types of information on the moving body 1 traveling on the track W1. Specifically, the information acquisition unit 1000 acquires the moving body-specific information and the track information, with reference to the storage 103. Further, the information acquisition unit 1000 acquires the traveling velocity of the moving body 1 (hereinafter, also referred to as "moving body velocity") via the velocity detection device 13. Further, the information acquisition unit 1000 acquires the current position of the moving body 1 (hereinafter, also referred to as "moving body position") via the position detection device 14.

Further, the information acquisition unit 1000 acquires the deviation amount (displacement) from the track W1 at a current time at each installation position via the displacement sensors 15F and 15R. Further, the information acquisition unit 1000 acquires the steering angles of the actuators 11F and 11R at a current time via the steering angle sensors 12F and 12R, respectively.

The feedforward steering angle calculation unit 1001 calculates the steering angle to be commanded to each of the actuators 11F and 11R in feedforward, by using various types of information (moving body-specific information, moving body position, moving body velocity, and track information) acquired by the information acquisition unit 1000.

As illustrated in FIG. 4, the feedforward steering angle calculation unit 1001 further has functions as the kinematic component calculation unit 1001a and the dynamic component calculation unit 1001b.

The kinematic component calculation unit 1001a calculates the kinematic component of the steering angle to be commanded, based on the geometrical relationship between the "bogie position" indicated in the moving body-specific information and the "curvature" of the track W1 in the "moving body position".

The dynamic component calculation unit 1001b calculates the dynamic components of the steering angle to be commanded, based on an equation of motion including the "bogie position" and "vehicle body mass" indicated in the moving body-specific information, "moving body velocity", and "curvature" of the track W1 in the "moving body position".

The feedback steering angle calculation unit 1002 acquires the deviation amount and steering angle at a current time via the displacement sensors 15F and 15R and the steering angle sensors 12F and 12R, and performs feedback control of the steering angle. Specifically, the feedback steering angle calculation unit 1002 acquires the deviation amount of the moving body 1 from the track W1 at a current time, and calculates a steering angle such that the deviation amount becomes smaller as the steering angle to be applied at the next time.

The steering angle command output unit 1003 outputs a steering angle command indicating the sum of the feedforward steering angle calculated by the feedforward steering angle calculation unit 1001 and the feedback steering angle calculated by the feedback steering angle calculation unit 1002, to the actuators 11F and 11R.

(Processing Flow of Moving Body Control Device)

Figure 5:
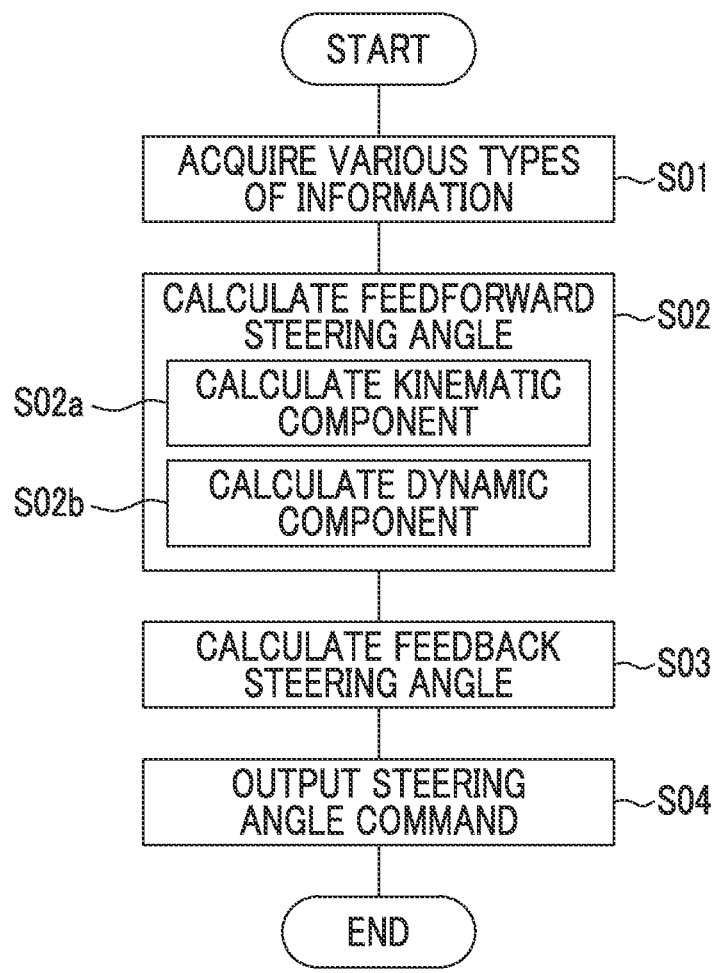
FIG. 5 is a diagram illustrating a processing flow of a controller according to the first embodiment.

FIG. 5 is a diagram illustrating a processing flow of a controller according to the first embodiment.

Figure 6:
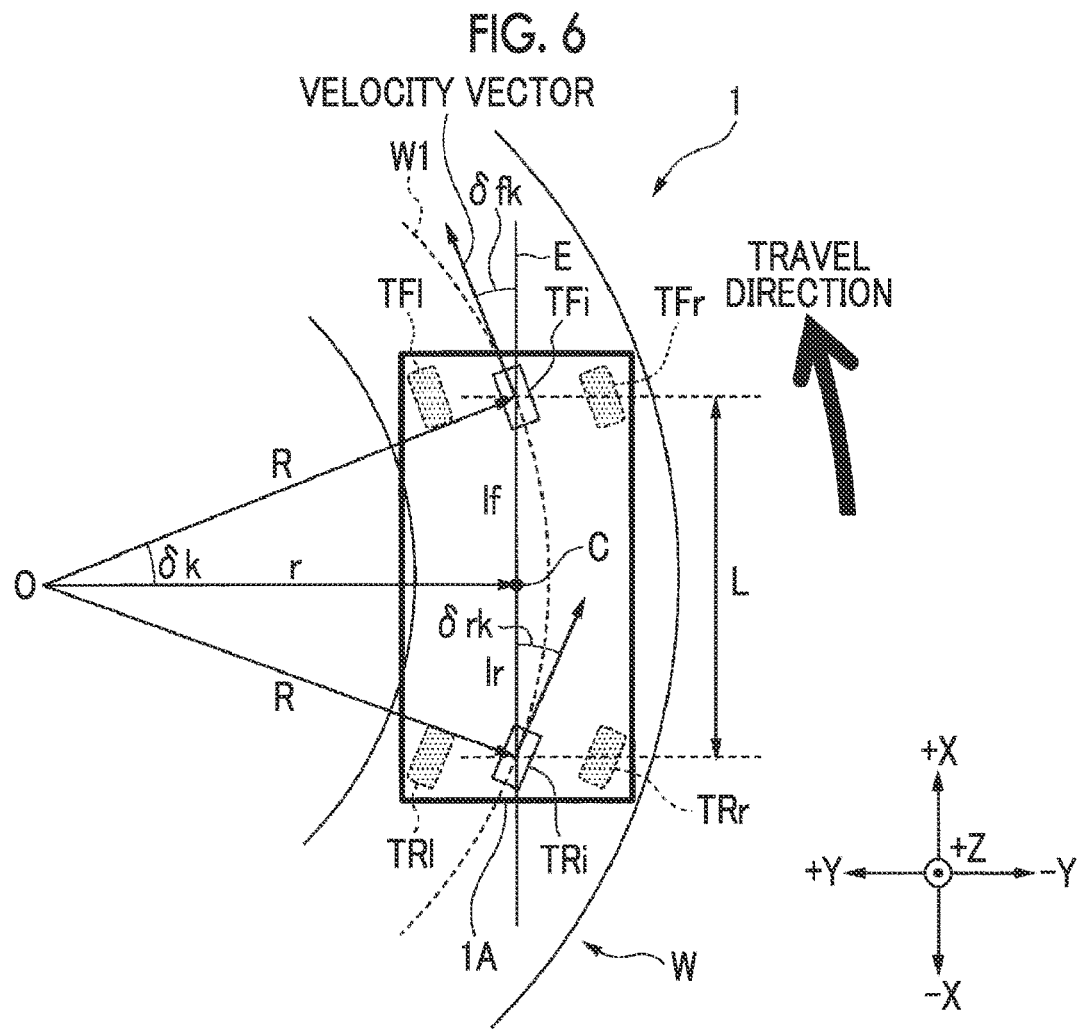
FIG. 6 is a diagram for explaining in detail the processing of the controller according to the first embodiment.

FIG. 6 is a diagram used for a detailed explanation of the process of the controller according to the first embodiment. Hereinafter, each process executed by the controller will be described in detail with reference to FIGS. 5 and 6.

First, the information acquisition unit 1000 of the CPU 100 acquires various types of information through the storage 103, the velocity detection device 13, and the position detection device 14 (step S01). Specifically, the information acquisition unit 1000 acquires the "moving body position", the "moving body velocity", the "bogie position" and the "vehicle body mass" included in the moving body-specific information, and the track information (FIG. 3).

Next, the feedforward steering angle calculation unit 1001 of the CPU 100 calculates the feedforward steering angle derived based on step S01 (step S02). In this step S02, the kinematic component calculation unit 1001a calculates the kinematic component of the feedforward steering angle (step S02a), and the dynamic component calculation unit 1001b calculates the dynamic component of the feedforward steering angle (step S02b).

The contents of the processes of steps S02a and S02b will be described in detail with reference to FIG. 6.

FIG. 6 indicates the geometrical relationship between the moving body 1 and the track W1, when the moving body 1 is traveling on a circular track having a radius R forming a part of the track W1. In FIG. 6, the front-rear direction of the moving body 1 is represented as ±X direction, the left-right direction of the moving body 1 (the direction orthogonal to the front-rear direction on the traveling surface) is represented as ±Y direction, and the vertical direction of the moving body 1 (the direction orthogonal to the traveling surface) is represented as ±Z direction.

The following description will be made by replacing the two front bogies TF1 and TFr installed on the front left and right sides of the moving body 1 with a single virtual front bogie TFi installed at the center in the left-right direction (that is, on the vehicle central axis E). Further, the following description will be made by replacing the two rear bogies TR1 and TRr installed on the rear left and right sides of the moving body 1 with a single virtual rear bogie TRi installed at the center position in the left-right direction (that is, on the vehicle central axis E).

The front bogie distance lf illustrated in FIG. 6 is the distance from the center of gravity C of the moving body housing 1A to the front bogie TFi. Further, the rear bogie distance lr illustrated in FIG. 6 is the distance from the center of gravity C of the moving body housing 1A to the rear bogie TFr. Further, the inter-bogie distance L illustrated in FIG. 6 is the distance from the front bogie TFi to the rear bogie TFr, and in the present embodiment, it corresponds to the sum of the front bogie distance lf and the rear bogie distance lr (L=lf+lr). The front bogie distance lf and the rear bogie distance lr are recorded in advance in the storage 103 as moving body-specific information.

Further, the turning radius r of the moving body 1 traveling on the circular track having the radius R is the distance from the origin O of the circular track to the center of gravity C of the moving body housing 1A. The turning radius r is a parameter that can be calculated from the geometrical relationship between the radius R of the circular track and the front bogie distance lf or the rear bogie distance lr. Further, the radius R of the circular track can be calculated based on the curvature s of the circular track (R=1/s).

Generally, when the steering angle of the bogie is "δ" and the angle formed by the velocity vector at the mounting position of the bogie with respect to the vehicle central axis E is "δk", the relationship between the steering angle δ, the angle δk, and the lateral force f generated by the bogie (force acting in the ±Y direction) is expressed by Expression (1).

[Expression 1]

$$f = 2K(\delta - \delta_k) \tag{1}$$

By modifying Expression (1), the steering angle to be commanded to the bogie can be expressed by Expression (2).

[Expression 2]

$$\delta = \delta_k + \frac{f}{2K} \tag{2}$$

"K" in Expressions (1) and (2) is a proportional coefficient K (cornering power) of the lateral force f generated by one wheel according to the slip angle (δ-δk). In the present embodiment, there are two front bogies and two rear bogies on each side, so that "2K" is shown in Expressions (1) and (2). The proportional coefficient K is one of the information included in the moving body-specific information, and is known information previously recorded in the storage 103.

According to Expression (2), with the steering angle δ for the front bogie TFi as "δf" and the steering angle δ for the rear bogie TRi as "δr", the steering angles of and δr are expressed by Expression (3).

[Expression 3]

$$\left.\begin{aligned}\delta_f &= \delta_{fk} + \frac{f_f}{2K} = \delta_{fk} + \delta_{fd} \\ \delta_r &= \delta_{rk} + \frac{f_r}{2K} = \delta_{rk} + \delta_{rd}\end{aligned}\right\} \tag{3}$$

"δfk" in Expression (3) is an angle formed by the velocity vector at the mounting position of the front bogie TFi with respect to the vehicle central axis E. Further, "δrk" in Expression (3) is an angle formed by the velocity vector at the mounting position of the rear bogie TRi with respect to the vehicle central axis E (see FIG. 6).

Further, "ff" in Expression (3) is a lateral force generated by the front bogie TFi at the mounting position, and "fr" in Expression (3) is a lateral force generated by the rear bogie TRi at the mounting position. As shown in Expression (3), when "ff/2K" is set to "δfd" and "fr/2K" is set to "δrd", the steering angles δf and δr to be given to the front bogie TFi and the rear bogie TRi, respectively can be divided into kinematic components δfk and δrk, which are force-independent components (components determined from geometrical relationships), and dynamic components δfd and δrd, which are force-dependent components.

(Calculation Procedure of Kinematic Components)

The procedure for calculating the kinematic components δfk and δrk (step S02a) by the kinematic component calculation unit 1001a will be described.

The kinematic components δfk and δrk can be expressed by Expression (4) by using the curvature s (=1/R) of the track W1 at the position where the moving body 1 exists.

[Expression 4]

$$\left.\begin{aligned}\delta_{fk} &= \sin^{-1}\frac{L}{2}s \\ \delta_{rk} &= -\sin^{-1}\frac{L}{2}s\end{aligned}\right\} \tag{4}$$

Therefore, in step S02a, the kinematic component calculation unit 1001a refers to the track information (FIG. 3) and specifies the curvature s corresponding to the "moving body position" (current position) acquired via the position detection device 14. Then, the kinematic component calculation unit 1001a calculates the kinematic components δfk and δrk by substituting the specified curvature s and the known inter-bogie distance L into Expression (4).

(Procedure for Calculating Dynamic Components)

The procedure for calculating the dynamic components δfd and δrd (step S02b) by the dynamic component calculation unit 1001b will be described.

When the moving body 1 moves along the track W1 illustrated in FIG. 6, the translational equation of motion (Expression (5)) in the left-right direction (±Y direction) of the moving body housing 1A and the equation of motion of rotation around the center of gravity C (Expression (6)) are established. In the text, the symbol with one dot attached to "θdes" is referred to as "θdes (˙)", and the symbol with two dots attached to "θdes" is referred to as "θdes (¨)".

[Expression 5]

$$mr\dot{\theta}_{des}{}^2 = f_f + f_r \tag{5}$$

[Expression 6]

$$I\ddot{\theta}_{des} = l_f f_f - l_r f_r \tag{6}$$

"θdes (˙)" in Expression (5) is the yaw angular velocity of the moving body 1. "mrθdes (˙)" on the left side of Expression (5) is a centripetal force generated from the center of gravity C toward the origin O, when the moving body housing 1A having the vehicle body mass m turns with the turning radius r. That is, as illustrated in Expression (5), the centripetal force "mrθdes (˙)" generated in the moving body housing 1A is balanced with the sum of the lateral force ff generated by the front bogie TFi and the lateral force fr generated by the rear bogie TRi.

"θdes (¨)" in Expression (6) is the yaw angular acceleration of the moving body 1. Further, in Expression (6) is the moment of inertia of the moving body housing 1A, and can be calculated from the vehicle body mass m and the turning radius r (I=mr^2). "Iθdes (¨)" on the left side of Expression (6) is the torque acting on the moving body housing 1A. That is, as illustrated in Expression (6), the torque "Iθdes (¨)" for rotating the moving body housing 1A corresponds to the sum of the torque (lf·ff) based on the lateral force ff that the front bogie TFi acts on the mounting position and the torque (−lr·fr) based on the lateral force fr that the rear bogie TRi acts on the mounting position.

Further, the yaw angular velocity θdes (˙) and the yaw angular acceleration θdes (¨) are represented by Expressions (7) and (8), respectively.

[Expression 7]

$$\dot{\theta}_{des} = sv \tag{7}$$

[Expression 8]

$$\ddot{\theta}_{des} = \dot{s}v + s\dot{v} = s_x v^2 + sa \tag{8}$$

"v" in Expression (7) is the moving body velocity (traveling velocity). In step S02b, the dynamic component calculation unit 1001b refers to the track information (FIG. 3) and specifies the curvature s corresponding to the moving body position (current position) acquired via the position detection device 14. Then, the dynamic component calculation unit 1001b calculates the yaw angle velocity θdes(˙), by substituting the moving body velocity v acquired via the velocity detection device 13 and the curvature s specified from the track information into Expression (7).

"sx" in Expression (8) is the curvature change rate. Further, "a" in Expression (8) is a moving body acceleration (acceleration in the travel direction). The moving body acceleration a can be calculated by time-differentiating the moving body velocity v acquired through the velocity detection device 13.

"sx" in Expression (8) is the curvature change rate. In step S02b, the dynamic component calculation unit 1001b refers to the track information (FIG. 3) and specifies the curvature s and the curvature change rate sx corresponding to the "moving body position" (current position) acquired via the position detection device 14. Then, the dynamic component calculation unit 1001b calculates the yaw angular acceleration θdes(¨), by substituting the moving body velocity v (moving body acceleration a) acquired (calculated) via the velocity detection device 13 and the curvature s and the curvature change rate sx specified from the track information into Expression (8).

When Expressions of motion shown in Expressions (5) and (6) are solved for the lateral force ff of the front bogie TFi and the lateral force fr of the rear bogie TRi, Expression (9) is obtained.

[Expression 9]

$$\left.\begin{array}{l} f_f = \dfrac{I\ddot{\theta}_{des} + l_r m v \dot{\theta}_{des}}{L} \\ f_r = \dfrac{-I\ddot{\theta}_{des} + l_f m v \dot{\theta}_{des}}{L} \end{array}\right\} \quad (9)$$

However, in Expression (9), "lf+lr" is set as "L".

Next, in consideration of the bank angle φ of the track W1, the forces ffTire and frTire to be actually generated by the front bogie TFi and the rear bogie TRi are obtained. The forces ffTire and frTire to be actually generated by the front bogie TFi and the rear bogie TRi are obtained by subtracting the forces ffBank and frBank generated by the bank angle φ of the track W1 from the lateral forces ff and fr. Specifically, the forces ffTire and frTire to be actually generated by the front bogie TFi and the rear bogie TRi are expressed by Expression (10).

[Expression 10]

$$\left.\begin{array}{l} f_{fTire} = f_f - f_{fBank} = \dfrac{I\ddot{\theta}_{des} + l_r m v \dot{\theta}_{des} - l_r m g \sin\phi_f}{L} \\ f_{rTire} = f_r - f_{fBank} = \dfrac{-I\ddot{\theta}_{des} + l_f m v \dot{\theta}_{des} - l_f m g \sin\phi_r}{L} \end{array}\right\} \quad (10)$$

In Expression (10), the bank angle of the track W1 at the mounting position of the front bogie TFi is set to "φf", and the bank angle of the track W1 at the mounting position of the rear bogie TRi is set to "φr". The forces ffBank and frBank generated by the bank angle φ of the track W1 are the forces in the left-right direction generated in response to the gravity (the product of the vehicle body mass m and the gravity acceleration g) acting on the moving body housing 1A.

The slide angle (δ-δk) multiplied by the cornering power "2K" is the force ffTire and frTire to be generated by the front bogie TFi and the rear bogie TRi, respectively. Therefore, the dynamic component δfd of the steering angle to be given to the front bogie TFi and the dynamic component δrd of the steering angle to be given to the rear bogie TRi are expressed by Expression (11), respectively.

[Expression 11]

$$\left.\begin{array}{l} f_{fd} = \dfrac{I\ddot{\theta}_{des} + l_r m (v\dot{\theta}_{des} - g\sin\phi_f)}{2KL} \\ f_{rd} = \dfrac{-I\ddot{\theta}_{des} + l_f m (v\dot{\theta}_{des} - g\sin\phi_r)}{2KL} \end{array}\right\} \quad (11)$$

In step S02b, the dynamic component calculation unit 1001b further calculates the dynamic components δfd and δrd, by substituting the yaw angular velocity θdes (˙) (Expression (7)) of the moving body 1 and the yaw angular acceleration θdes (¨) (Expression (8)) into Expression (11). At this time, the dynamic component calculation unit 1001b refers to the track information (FIG. 3) and specifies the bank angle θf of the front bogie TFi and the bank angle φr of the rear bogie TRi corresponding to the "moving body position" (current position) acquired via the position detection device 14.

As described above, the feedforward steering angle calculation unit 1001 calculates the kinematic components δfk and δrk of the steering angles δf and δr based on Expression (4), and calculates the dynamic components δfd and δrd, based on Expression (11).

Returning to FIG. 5, the feedback steering angle calculation unit 1002 acquires the displacement acquired via the displacement sensors 15F and 15R and the current steering angle acquired via the steering angle sensors 12F and 12R, and calculates the feedback steering angle (step S03). Since the feedback control executed by the feedback steering angle calculation unit 1002 according to the present embodiment can be achieved by a known technique, a detailed description thereof will be omitted.

Next, the steering angle command output unit 1003 integrates the feedforward steering angles (δf, δd) calculated by the feedforward steering angle calculation unit 1001 and the feedback steering angle calculated by the feedback steering angle calculation unit 1002, and outputs a new steering angle command to the actuators 11F and 11R (step S04).

(Action, Effect)

As described above, the controller 10 (moving body control device) according to the first embodiment includes a feedforward steering angle calculation unit 1001 that calculates steering angles δf and δr to be given to the front bogie TFi and the rear bogie TRi, respectively, by using the moving body-specific information (bogie positions lf and lr, vehicle body mass m, and cornering power K), the moving body position, the moving body velocity, and the track information (FIG. 3). Then, the feedforward steering angle calculation unit 1001 calculates the steering angles δf and δd according to a sum of kinematic components calculated based on a geometrical relationship between the bogie positions lf and lr and the curvature s of the track W1 at the moving body position (current position), and dynamic components calculated based on an equation of motion including the bogie position, the vehicle body mass m, the moving body velocity v, and the curvature s and a curvature change rate sx of the track at the moving body position (current position).

The controller 10 according to the present embodiment has the above-described characteristics and has the following effects. That is, the steering angle can be calculated in consideration of not only the kinematic component (steering angle based on the geometrical relationship) but also the dynamic component which is a component corresponding to the force acting on the moving body 1. Thus, even when the moving body 1 accelerates or decelerates, or when the track W1 has a bank angle, an appropriate steering angle can be calculated according to the acceleration and the bank angle. Further, in the normal track, a relaxation curve for gently changing the curvature s from 0 to s0 is provided at the boundary between a linear track (curvature s=0) and a circular track with curvature s=s0 (s0>0). According to the controller 10 according to the present embodiment, the characteristics of the relaxation curve (that is, the track information curvature change rate sx) are also dynamically considered.

Second Embodiment

Next, a moving body control device according to the second embodiment and a moving body including the moving body control device will be described with reference to FIG. 7. The functional configuration of the moving body 1 according to the second embodiment is the same as that of the first embodiment, and thus the illustration is omitted.

(Calculation Procedure of Kinematic Components)

Figure 7:
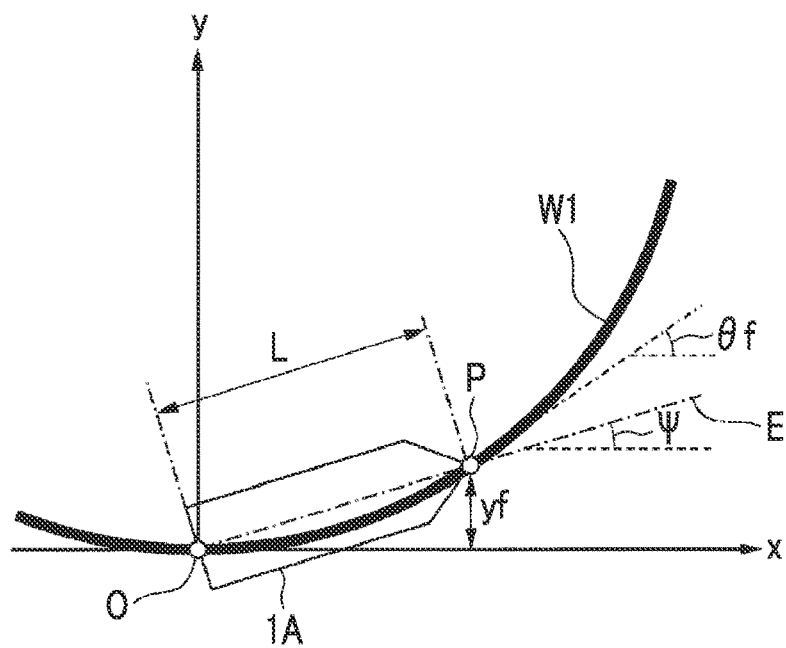
FIG. 7 is a diagram for explaining in detail the processing of a controller according to a second embodiment.

FIG. 7 is a diagram for explaining the functional configuration of the controller 10 according to the second embodiment.

It is described that the kinematic component calculation unit 1001a according to the first embodiment calculates the kinematic components δfk and δrk of the steering angle, based on Expression (4). However, since Expression (4) assumes that the curvature s travels in a constant circular track (approximate curve), an error may occur before and after the change point of the curvature s in the actual track W1. Therefore, the kinematic component calculation unit 1001a according to the second embodiment calculates the kinematic components δfk and δrk according to the procedure described below.

As illustrated in FIG. 7, the mounting position of the rear bogie TRi of the moving body housing 1A is set to the origin O of the xy coordinates. The x-axis of the xy coordinates coincides with the tangent to the track W1 at the origin O. Further, the y-axis of the xy coordinate is orthogonal to the x-axis (tangent of the track W1 at the origin O).

Further, it is assumed that the point P indicating the mounting position of the front bogie TFi of the moving body housing 1A exists at a positive position on the x-axis.

Assuming that any position on the track W1 is represented by a distance c from the origin O, the track shape of the track W1 is defined as in Expression (12).

[Expression 12]

$$\left. \begin{array}{l} y = y(c) \\ x = x(c) \end{array} \right\} \quad (12)$$

Further, when the angle formed by the tangent at any position (x, y) on the track W1 with respect to the tangent (x axis) at the origin O is "θ", Expression (13) is established.

[Expression 13]

$$\tan\theta = \frac{dy}{dx} \quad (13)$$

Further, using this angle θ, the curvature change rate sx can be expressed by Expression (14).

[Expression 14]

$$\frac{d\theta}{dc} = s_x(c) \quad (14)$$

According to Expression (14), the angle θ at any position on the track W1 can be calculated by integrating the curvature change rate sx previously recorded in the track information with the distance c from the origin O.

Here, in the range from the rear bogie TRi to the front bogie TFi, the track W1 and the x-axis are close to each other, so that "dx=dc" can be approximated. Then, Expression (15) is established based on Expression (13).

[Expression 15]

$$\frac{dy}{dc} \cong \tan\theta \quad (15)$$

According to Expression (15), the y coordinate value at any position on the track W1 can be calculated by integrating the right side "tan θ" of Expression (15) with the distance c from the origin O. That is, by using Expressions (14) and (15), the value of the y coordinate at any position on the track W1 can be calculated from the curvature change rate sx of the track information (FIG. 3).

According to FIG. 7, the kinematic component δrk of the steering angle of the rear bogie TRi located at the origin O is represented by an angle (−Ψ) with respect to the vehicle body central axis E. Therefore, the kinematic component δrk is obtained by Expression (16).

[Expression 16]

$$\begin{aligned} \delta_{rk} &= -\psi \\ &= -\tan^{-1}\left(\frac{y(L)}{L}\right) \\ &= -\tan^{-1}\left(\frac{f_f}{L}\right) \end{aligned} \quad (16)$$

"yf" in Expression (16) is the y coordinate value of the point P (mounting position of the front bogie TFi), and from Expression (15), can be obtained by integrating "tan θ" with the distance c (=inter-bogie distance L) from the origin O.

Further, according to FIG. 7, the kinematic component δfk of the steering angle of the front bogie TFi located at the point P is represented by an angle (θf−Ψ) with respect to the vehicle body central axis E. Here, "θf" is an angle θ at the point P, and can be obtained by integrating the curvature change rate sx with the distance c (=inter-bogie distance L) from the origin O from Expression (14). Therefore, the kinematic component δfk of the front bogie TFi is obtained by Expression (17).

[Expression 17]

$$\delta_{fk} = \theta_f - \psi = \theta_f - \tan^{-1}\left(\frac{y_f}{L}\right) \quad (17)$$

(Action, Effect)

As described above, the controller 10 (kinematic component calculation unit 1001a) according to the second embodiment calculates the kinematic components, based on an angle θf formed by the tangent (second tangent) of the track W1 at the position (point P) of the front bogie TFi with respect to the tangent (x axis (first tangent)) of the track W1 at the position (origin O) of the rear bogie TRi, and the distance yf between the rear bogie TRi and the front bogie TFi in the direction orthogonal to the x-axis (y-axis direction).

By doing so, the directions of the tangent of the track W1 corresponding to the position of the rear bogie and the tangent of the track W1 corresponding to the position of the front bogie are calculated, based on the curvature change rate sx recorded in the track information, so that the kinematic component of the steering angle is calculated without using the approximate curve of the circular track. Therefore, it is possible to reduce the error that occurs before and after the change point of the curvature s in the track W1.

<Modification Example of Second Embodiment>

A moving body control device according to a modification example of the second embodiment and a moving body including the moving body control device will be described.

The controller 10 according to the modification example is characterized in that the calculation complexity is reduced by the division analysis integration that is considered by dividing the integration interval. The details will be described below.

The angle θ (FIG. 7) is very small in the range of the inter-bogie distance L. Therefore, it can be approximated as in Expression (18).

[Expression 18]

$$\frac{dy}{dc} \cong \tan\theta \quad (18)$$

According to Expression (18), the differential equations (Expressions (14) and (15)) described in the second embodiment are expressed as Expression (19).

[Expression 19]

$$\left.\begin{array}{l} y(0) = 0 \\ \theta(0) = 0 \\ \dfrac{dy}{dc} = \theta \\ \dfrac{d\theta}{dc} = s_x(c) \end{array}\right\} \quad (19)$$

That is, the one obtained by integrating the curvature change rate sx once is "θ", and the one obtained by integrating twice is "y".

Since the shape element constituting the track W1 is any one of "straight line", "curve" (circular track), and "relaxation curve", the curvature of each shape element in the shape section i can be expressed by the following linear equation (Expression (20)).

[Expression 20]

$$s_i(c_i) = a_i c_i + b_i \quad (20)$$

In Expression (20), "ci" is a relative distance from the section entrance of each shape element, and "ai" and "bi" are constants determined according to the shape element. For example, when the shape element in the shape section i is a "straight line", "ai=0" and "bi=0". When the shape element in the shape section i is a "curve", "ai=0" and "bi=bi1" (bi1=a constant corresponding to the curvature of the "curve"). When the shape element in the shape section i is the "relaxation curve", "ai=ai1" (ai1=a constant corresponding to the curvature change rate of the "relaxation curve"), and "bi=bi1" (bi1=a constant corresponding to the curvature s of the section entrance of the "relaxation curve").

Assuming that there are N shape sections i between the rear bogie and the front bogie, the "y" and "θ" of the first exit are given by Expression (21).

[Expression 21]

$$\left.\begin{array}{l} \theta(L_1) = \displaystyle\int_0^{L_1}(a_1 c + b_1)dc = \left[\dfrac{a_1}{2}c^2 + b_1 c\right]_0^{L_1} = \dfrac{a_1}{2}L_1^2 + b_1 L_1 \\ y(L_1) = \displaystyle\int_0^{L_1} y(c)dc = \left[\dfrac{a_1}{6}c^2 + \dfrac{b_1}{2}c^2 + \theta_1 * c\right]_0^{L_1} = \dfrac{a_1}{6}L_1^3 + \dfrac{b_1}{2}L_1^2 + \theta_1 * L_1 \end{array}\right\} \quad (21)$$

Since the latter section may be calculated and added in the same manner, the entire calculation result is expressed by the following recurrence equation (Expression (22)).

[Expression 22]

$$\left.\begin{array}{l} \theta_i = \theta_{i-1} + \dfrac{a_i}{2}L_i^2 + b_i L_i \\ y_i = y_{i-1} + \dfrac{a_i}{6}L_i^3 + \dfrac{b_i}{2}L_i^2 + \theta_i * L_i \end{array}\right\} \quad (22)$$

However, "i" is 1 to N, y0=0, and θ0=0.

According to the controller 10 according to the above modification example, only the calculation for each shape section i of each shape element is required, so that the calculation amount can be reduced while maintaining the calculation accuracy. This makes it possible to calculate the steering angle with high accuracy online, for example.

In the first and second embodiments described above, the various processing processes of the controller 10 described above are stored in a computer-readable recording medium in the form of a program, and the above various processes are performed by the program being read and executed by the computer. Further, the computer-readable recording medium is a magnetic disk, a magneto-optical disk, a CD-ROM, a DVD-ROM, a semiconductor memory, or the like. Further, this computer program may be distributed to a computer via a communication line, and the computer receiving the distribution may execute the program.

The program may be for realizing a part of the above-described functions. Further, the program may be a so-called difference file (difference program), which can achieve the above-described functions in combination with a program already recorded in the computer system.

As described above, some embodiments according to the present disclosure have been described, but all of these embodiments are presented as examples and are not intended to limit the scope of disclosure. These embodiments can be implemented in various other embodiments, and various omissions, replacements, and changes can be made without departing from the gist of the disclosure. These embodiments and variations thereof are included in the scope and equivalent of the disclosure described in the claims as well as in the scope and abstract of the disclosure.

INDUSTRIAL APPLICABILITY

According to each aspect of the above disclosure, it is possible to calculate the feedforward steering angle with higher accuracy in consideration of dynamics.

REFERENCE SIGNS LIST

1 Moving body
10 Controller (moving body control device)
100 CPU
1000 Information acquisition unit
1001 Feedforward steering angle calculation unit
1001a Kinematic component calculation unit
1001b Dynamic component calculation unit
1002 Feedback steering angle calculation unit
1003 Steering angle command output unit
101 Connection interface
102 Memory
103 Storage
11F, 11R Actuator
12F, 12R Steering angle sensor
13 velocity detection device
14 Position detection device
15F, 15R Displacement sensor

The invention claimed is:

1. A moving body control device which controls a moving body including a bogie and an actuator that is a steering mechanism of the bogie and traveling along a predetermined track, the device comprising:
an information acquisition unit that acquires moving body-specific information including a bogie position and a weight of the moving body, a moving body position, a moving body velocity, and track information including a curvature for each position of the track;
a feedforward steering angle calculation unit that calculates a feedforward steering angle by using the moving body-specific information, the moving body position, the moving body velocity, and the track information; and
a steering angle command output unit that outputs a steering angle command based on the feedforward steering angle calculated by the feedforward steering angle calculation unit to the actuator of the moving body, wherein
the feedforward steering angle calculation unit calculates the feedforward steering angle according to a sum of a kinematic component calculated based on a geometrical relationship between the bogie position and the curvature of the track at the moving body position, and a dynamic component calculated based on an equation of motion including the bogie position, the weight of the moving body, the moving body velocity, and the curvature and a curvature change rate of the track at the moving body position.

2. The moving body control device according to claim 1, wherein
the track information further includes a bank angle for each position of the track, and
the feedforward steering angle calculation unit calculates the dynamic component by further using force acting in a left-right direction of the moving body according to the bank angle.

3. The moving body control device according to claim 1, further comprising:
a feedback steering angle calculation unit that acquires a deviation amount of the moving body from the track at a current time, and calculates a feedback steering angle such that the deviation amount becomes small, wherein
the steering angle command output unit outputs the steering angle command that is a sum of the feedforward steering angle calculated by the feedforward steering angle calculation unit and the feedback steering angle calculated by the feedback steering angle calculation unit.

4. The moving body control device according to claim 1, wherein
the feedforward steering angle calculation unit calculates the kinematic components, based on an angle formed by a second tangent which is a tangent of the track at a position of a front bogie with respect to a first tangent which is a tangent of the track at a position of a rear bogie, and a distance between the rear bogie and the front bogie in a direction orthogonal to the first tangent.

5. A moving body comprising:
a bogie;
an actuator that is a steering mechanism of the bogie; and
the moving body control device according to claim 1.

6. A moving body control method which controls a moving body including a bogie and an actuator that is a steering mechanism of the bogie and traveling along a predetermined track, the method comprising:
a step of acquiring moving body-specific information including a bogie position and a weight of the moving body, a moving body position, a moving body velocity, and track information including a curvature for each position of the track;
a step of calculating a feedforward steering angle by using the moving body-specific information, the moving body position, the moving body velocity, and the track information; and
a step of outputting a steering angle command based on the calculated feedforward steering angle to the actuator of the moving body, wherein
the step of calculating the feedforward steering angle includes a step of calculating the feedforward steering angle according to a sum of a kinematic component calculated based on a geometrical relationship between the bogie position and the curvature of the track at the moving body position, and a dynamic component calculated based on an equation of motion including the bogie position, the weight of the moving body, the moving body velocity, and the curvature and a curvature change rate of the track at the moving body position.

7. A non-transitory computer-readable medium that stores a program causing a computer of a moving body control device which controls a moving body including a bogie and an actuator that is a steering mechanism of the bogie and traveling along a predetermined track to execute:

a step of acquiring moving body-specific information including a bogie position and a weight of the moving body, a moving body position, a moving body velocity, and track information including a curvature for each position of the track;

a step of calculating a feedforward steering angle by using the moving body-specific information, the moving body position, the moving body velocity, and the track information; and a step of outputting a steering angle command based on the calculated feedforward steering angle to the actuator of the moving body, wherein the step of calculating the feedforward steering angle includes a step of calculating the feedforward steering angle according to a sum of a kinematic component calculated based on a geometrical relationship between the bogie position and the curvature of the track at the moving body position, and a dynamic component calculated based on an equation of motion including the bogie position, the weight of the moving body, the moving body velocity, and the curvature and a curvature change rate of the track at the moving body position.

* * * * *